US006805811B2

(12) United States Patent
Hartley et al.

(10) Patent No.: US 6,805,811 B2
(45) Date of Patent: Oct. 19, 2004

(54) DEICING SOLUTION

(75) Inventors: Robert A. Hartley, Ontario (CA); David H. Wood, Rome, NY (US)

(73) Assignee: Sears Petroleum & Transport Corp., Rome, NY (US)

( * ) Notice: Subject to any disclaimer, the term of this patent is extended or adjusted under 35 U.S.C. 154(b) by 0 days.

(21) Appl. No.: 10/444,560

(22) Filed: May 23, 2003

(65) Prior Publication Data

US 2003/0209690 A1 Nov. 13, 2003

Related U.S. Application Data

(63) Continuation of application No. 10/212,318, filed on Aug. 5, 2002, now Pat. No. 6,599,440, which is a continuation-in-part of application No. 09/971,163, filed on Oct. 4, 2001, now Pat. No. 6,440,325, and a continuation-in-part of application No. 09/971,165, filed on Oct. 4, 2001, now Pat. No. 6,436,310, which is a continuation-in-part of application No. 09/755,587, filed on Jan. 5, 2001, now Pat. No. 6,299,793, which is a continuation-in-part of application No. 09/224,906, filed on Jan. 4, 1999, now abandoned.
(60) Provisional application No. 60/070,636, filed on Jan. 7, 1998.

(51) Int. Cl.$^7$ .................................................. C09K 3/18
(52) U.S. Cl. .......................................... 252/70; 106/13
(58) Field of Search .............................. 252/70; 106/13

(56) References Cited

U.S. PATENT DOCUMENTS

| 4,668,416 A | 5/1987 | Neal | 252/70 |
|---|---|---|---|
| 4,676,918 A | 6/1987 | Toth et al. | 252/70 |
| 4,746,449 A | 5/1988 | Peel | 252/70 |
| 4,824,588 A | 4/1989 | Lin | 252/70 |
| 5,135,674 A | 8/1992 | Kuhajek et al. | 252/70 |
| 5,635,101 A | 6/1997 | Janke et al. | 252/70 |
| 5,639,319 A | 6/1997 | Daly | 152/450 |
| 5,709,813 A | 1/1998 | Janke et al. | 252/70 |
| 5,772,912 A | 6/1998 | Lockyer et al. | 252/70 |
| 5,922,240 A | 7/1999 | Johnson et al. | 252/70 |
| 5,932,135 A | 8/1999 | Janke et al. | 252/70 |
| 6,080,330 A | 6/2000 | Bloomer | 252/70 |
| 6,149,834 A | 11/2000 | Gall et al. | 252/70 |
| 6,299,793 B1 | 10/2001 | Hartley et al. | 252/70 |
| 6,398,979 B2 | 6/2002 | Koefod et al. | 252/70 |
| 6,416,684 B1 | 7/2002 | Bloomer | 252/70 |
| 6,436,310 B1 | 8/2002 | Hartley et al. | 252/70 |
| 6,440,325 B1 | 8/2002 | Hartley et al. | 252/70 |
| 6,468,442 B2 | 10/2002 | Bytnar | 252/70 |
| 6,599,440 B2 * | 7/2003 | Hartley et al. | 252/70 |

FOREIGN PATENT DOCUMENTS

| RU | 1664808 | 7/1991 |
|---|---|---|
| WO | 01/07532 A1 | 2/2001 |

OTHER PUBLICATIONS

CRC Handbook of Chemistry and Physics, A Ready–Reference Book of Chemical and Physical Data, David R. Lide, 78th Edition 1997–1998, pp. 8–56, 8–61, 8–62, 8–64, 8–73, 8–74. no month.

Composition of Corn Steep Water during Steeping, Steven R. Hull, Byung Yun Yang, David Venzke, Kurt Kulhavy and Rex Montgomery, J. Agic. Food Chem. 1996, 44, 1857–1863.

Brewers Condensed Solubles. I. Composition and Physical Properties, B.R. Sebree, D.S. Chung and P.A. Seib, vol. 60, No. 2, 1983, pp. 147–151. no month.

Determination of the Carbohydrate Components of the Low Molecular Weight Fraction and Fraction E., Report No. 99–B21E–0050 (Interim No. 8) 4 pages, 2 Appendices, Dated Aug. 30, 1999.

Low–D.E. Corn Starch Hydrolysates, Multi–functional carbohydrates aid in food formulation, Reprinted from Food Technology, vol. 27, No. 3, pp. 38–40, Copyright 1972 by Institue of Food Technologies, Daniel G. Murray and Leslie R. Luft. no month.

Slip–sliding away, Southbridge Evening News, Southbridge, MA, Feb. 16, 1998, Bruce Uptom.

Public Works Engineering, Construction & Maintenace, Jul. 1997.

T.W. Graham Solomons and Craig B. Fryhle, Organic Chemistry 7th edition, pp. 1124–1125 (no date).

Phytic Acid: Chemistry and Applications, Edited by Ernst Graf, Pilatus Press, Minneapolis, MN, 1986, ISBN 0–9614915–0–7, pp. 1–21 and 118–125, (no month).

* cited by examiner

Primary Examiner—Anthony J. Green
(74) Attorney, Agent, or Firm—Wall Marjama & Bilinski LLP

(57) ABSTRACT

A de-icing and anti-icing composition in the form of an aqueous solution which includes a carbohydrate, a freezing point depressant and an anti-corrosion agent in the form of phytic acid and its salts.

8 Claims, No Drawings

DEICING SOLUTION

CROSS REFERENCE TO RELATED APPLICATIONS

This is a continuation of U.S. Ser. No. 10/212,318, filed Aug. 5, 2002 now U.S. Pat. No. 6,599,440 (granted Jul. 29, 2003), which is a continuation-in-part of application U.S. Ser. No. 09/971,163 now U.S. Pat. No. 6,440,325 and U.S. Ser. No. 09/971,165 now U.S. Pat. No. 6,436,310 both filed on Oct. 4, 2001 (Granted Aug. 20, 2002 and Aug. 27, 2002, respectively), which are both a continuation-in-part of U.S. Ser. No. 09/755,587, now U.S. Pat. No. 6,299,793, filed January 5, 2001 (Granted Oct. 9, 2001), which is a continuation-in-part application of U.S. Ser. No. 09/224,906 filed on Jan. 4, 1999, now abandoned and U.S. Ser. No. 60/070,636 filed Jan. 7, 1998, the entirety of each of the above application which are incorporated herein by reference.

BACKGROUND OF THE INVENTION

The current state of the art for coping with snow and ice on roads usually involves applying a deicer material such as a salt to the road surface. Sometimes antiskid materials such as sand or other aggregates such as gravel are added with or without a salt.

The use of salt and compositions having high concentrations of salt, cause an undesirable corrosive effect on vehicles, the road surface, and the environment with respect to the run off of water containing salt which contaminates the surrounding land and water.

Considering the above problems associated with salt formulations, there has been a continuing need for a deicing composition or formulation which can effectively melt snow and ice yet which reduces the corrosion and environmental contamination referred to above. In response to the above problems associated with the use of road salt, the prior art has looked to alternative formulations which are less corrosive and more environmentally friendly.

U.S. Pat. No. 5,635,101 (Janke et al.) relates to a deicing composition containing a by-product of a wet milling process of shelled corn. Corn kernels are steeped or soaked in a hot solution containing small amounts of sulfurous acid. The corn kernels are separated from the steep water and steep water solubles are used in the production of a deicing composition.

U.S. Pat. No. 4,676,918 (Toth et al.) relates to a deicing composition which comprises a mixture containing at least one component selected from a number of chlorides or urea and an admixture of waste concentrate of alcohol distilling that has a dry substance content of from 200 to 750 g/kg and from 10% to 80% by weight of water.

U.S. Pat. No. 6,080,330 (Bloomer) teaches a composition for use in preventing the formation of ice or snow on outdoor surfaces, such as roadways or aggregate stockpiles, and also for deicing surfaces upon which snow or ice has formed. The composition is formed from a waste product of the process of removing sugar from sugar beet molasses, also known as desugared sugar beet molasses.

The Janke et al., Toth et al. and Bloomer materials are naturally occurring substances with hundreds (if not thousands) of components such as complex carbohydrates, starches, sugars, proteins etc. and are normally used with a salt.

The above de-icing solutions now being introduced in the field employ agricultural residues e.g., corn based distillers solubles and solubles from the corn wet milling industries. These naturally occurring substances, which also include brewers condensed solubles, are extremely variable in composition, viscosity, film forming tendency, freezing temperature, pH etc., and consequently give varying performance when used in de-icing solutions. Depending upon the source and batch, these materials at low temperatures sometimes exhibit such resistance to flow that they cannot be applied evenly to a road surface or mixed with a chloride, rendering them virtually unsuitable for use.

Furthermore, these patents utilize materials which have highly undesirable or unnecessary ingredients leading to practical difficulties by manufacturers and users, such as stratification in storage, biological degradation, odor, plugging of filters and spray nozzles and environmental difficulties e.g. high biological oxygen demand due to the very high organic contents (about 40% by weight), presence of phosphorus compounds and heavy metals.

To improve quality and performance, and to meet current mandated standards, there is an immediate need for synthetic, chemically modified thickeners, and carefully purified materials which can be substituted for the currently used agricultural residues. Such a formulation would improve performance and reduce metal corrosion, spalling of concrete, toxicity and addresses environmental concerns.

It is therefore an object of the present invention to provide a deicing formulation which exhibits improved performance standards which overcomes the prior art problems described above.

It is a further object of the present invention to provide a deicing formulation which utilizes a synergistic combination of a low molecular weight carbohydrate and an inorganic freezing point depressant.

It is another object of the present invention to provide a deicing formulation which utilizes a low molecular weight carbohydrate to provide for improved ice melting properties and exhibits less corrosion.

It is a further object of the present invention to provide a deicing formulation which provides consistent physical and chemical properties, thereby assuring consistent quality and performance.

It is another object of the present invention to provide an economical, highly effective deicing formulation.

SUMMARY OF THE INVENTION

The present invention is based upon the discovery that low molecular weight (about 180 to 1,000) carbohydrates when used with an inorganic freezing point depressant such as a chloride salt has a synergistic effect upon freezing point depression. The formulation of deicing/anti-icing compositions employs carbohydrates of less than about 1,000 molecular weight, such as glucose/fructose, disaccharides, trisaccharides, tetrasaccharides, pentasaccharides, hexasaccharides, and mixtures thereof. The broader operative range for the carbohydrate molecular weight is from about 180 to 1,500, with the range of about 180 to 1,000 being preferred.

The basic composition of the present invention consists of at least the first two of the following three components in aqueous solution depending upon ambient weather conditions, terrain, nature and amount of freezing/snow precipitation, and environmental concerns:

(1) Inorganic freezing point depressants preferably in the form of chloride salts which include magnesium chloride, calcium chloride and sodium chloride. Metal acetates e.g. calcium magnesium acetate, and other suitable acetates may also be used.

(2) Low molecular weight carbohydrates in the 180 to 1,500 range (180–1,000 preferred). These carbohydrates can be obtained from a wide range of agricultural based products such as those derived from corn, wheat, barley, oats, sugar cane, sugar beets etc.

(3) Thickeners are used in certain applications as the third key component to increase the viscosity of the composition so that the liquid remains in contact with the road surface or with the solid particles in piles of rocksalt/sand, or rocksalt/aggregates, or salt alone, or sand or aggregate. Thickeners are mainly cellulose derivatives or high molecular weight carbohydrates. Typical molecular weights for cellulose derivatives are for methyl and hydroxy propyl methyl celluloses from about 60,000 to 120,000 and for hydroxy ethyl celluloses from about 750,000 to 1,000,000. Carbohydrate molecular weights range from about 10,000 to 50,000.

These components are used in an aqueous solution in the following concentrations:

| | Weight % |
|---|---|
| Carbohydrate | 3 to 60 |
| Inorganic Freezing Point Depressant | 5 to 35 |
| Thickener | 0.15 to 10 |

In a further embodiment of the present invention, it has been found that phytic acid functions as a highly effective anti-corrosion agent in the above formulation.

The above described compositions provide a de-icing and anti-icing formulation which can be formulated more uniformly to provide for more consistent properties from batch to batch, while at the same time providing for increased ice melting properties.

DETAILED DESCRIPTION OF THE INVENTION

In the development of the present invention it was determined that the predominant organic constituents in the prior art formulations described above were carbohydrates, and in one series of tests, Brewers Condensed Solubles (BCS), which was selected as a test sample, was diluted with water and separated into several fractions by the addition of increasing amounts of an ethanol/methanol 85/15 v/v mix. The characteristic of the various fractions and their freezing points when mixed with 15% magnesium chloride are tabulated below.

TABLE 1

| Sample | % ethanol/methanol added | % Solids | % Carbohydrates | Freezing Point °F. | °C. |
|---|---|---|---|---|---|
| Brewers (BCS) | NIL | 43.6 | 43.1 | −31.9 | −35.5 |
| Fraction A Precipitate | 60 | 5.3 | 3.8 | −10.1 | −23.4 |
| Fraction B Precipitate | 74 | 3.7 | 3.2 | −10.8 | −23.8 |

TABLE 1-continued

| Sample | % ethanol/methanol added | % Solids | % Carbohydrates | Freezing Point °F. | °C. |
|---|---|---|---|---|---|
| Fraction C Precipitate | 82 | 2.8 | 2.1 | −10.3 | −23.5 |
| Fraction D Precipitate | 85 | 1.3 | 0.6 | −9.9 | −23.3 |
| Fraction E Solubles | 85 | 30.7 | 29.8 | −22.7 | −30.4 |

Fraction A consisted of essentially insoluble, high molecular weight polysaccharides, whereas Fractions B to D inclusive gave gummy residues of polysaccharides. Fractions A to D had little effect upon freezing point depression. Fraction E, the largest component, had a considerable effect upon freezing point and is a mixture of lower molecular weight polysaccharides.

Fraction E was also examined for ice melting characteristics at 25° F. (−4° C.) in admixture with magnesium chloride employing SHRP H-205.2 Test Method for Ice Melting of Liquid Deicing Chemicals.

TABLE 2

| Deicing Solution | Lbs weight ice melted per lb weight of inorganic salt |
|---|---|
| 15% magnesium chloride, control | 16.9 |
| Brewers BCS/MgCl$_2$ | 18.2 |
| Fraction E/MgCl$_2$ | 19.3 |
| 32% calcium chloride | 7.3 |
| 26.3% sodium chloride | 7.5 |

The last two figures were calculated from data in SHRP H-205.2. These results indicate the appreciable improvement over the commonly used sodium and calcium chlorides in ice melting characteristics when Fraction E and Brewers BCS are mixed with magnesium chloride. There is also a 14% improvement over the control when Fraction E is used. This, together with freezing point depression improvement indicates that an appreciably improved deicing solution can be formulated.

The next stage of the investigation consisted of attempting to isolate and define the active components in the Brewers BCS. This was done by first filtering employing a 0.45 micron membrane followed by ultrafiltration using a Model UFP-1-E-s (A/G Technology Corporation, Needham, Mass.) with a nominal cutoff at a molecular weight of 1000 and finally gel permeation chromatography (GPC) using a Waters LC Module 1 unit with a set of three ultrahydrogel columns and 50 mm Na$_2$HPO$_4$ solution at pH7 as the mobile phase. The brewers BCS liquor had two major carbohydrate fractions (a) a low molecular weight fraction with the majority of components having a molecular weight of less than 1000, and (b) a high molecular weight fraction containing compounds with a molecular weight of 12,600 but with some components in the 1000 to 10,000 molecular weight range. Fraction E was found to have a chromatographic profile very similar to the low molecular weight fraction (a) above with a molecular weight of less than 1000. Cane Sugar DCS liquor had more components than the Brewers BCS but had similar high and low molecular weight fractions with similar molecular weight distributions.

In order to confirm that the low molecular weight fraction has the greatest effect upon freezing point depression, a further series of freezing points were measured using in this instance, Dead Sea Salt Solution from Jordan in lieu of laboratory grade magnesium chloride. Again the concentration of magnesium chloride was 15% by weight for all samples.

TABLE 3

| Sample | Freezing Point °F. | Freezing Point °C. |
|---|---|---|
| Control: Industrial grade magnesium chloride solution/Water | −0.4 | −18.0 |
| Brewers(BCS) | −31.9 | −35.5 |
| Brewers GPC High Mol Wt Fraction | −5.1 | −20.6 |
| Brewers GPC Low Mol Wt Fraction | −16.4 | −26.9 |
| Brewers BCS Fraction E | −13.4 | −25.2 |

It was thus shown that low molecular weight (less than 1000) carbohydrates had the greatest effect upon freezing point depression. Based upon these experiments, it was concluded that the formulation of deicing/anti-icing compositions should employ compounds in the less than 1000 molecular weight range such as those tabulated below in Table 4:

TABLE 4

| Carbohydrate | Molecular Weight |
|---|---|
| Glucose/fructose | 180 |
| Disaccharides | 342 |
| Trisaccharides | 504 |
| Tetrasaccharides | 666 |
| Pentasaccharides | 828 |
| Hexasaccharides | 990 |

There is available commercially a wide range of carbohydrates with varying carbohydrate compositions. An evaluation was conducted using simple sugars, disaccharides and polysaccharides in an attempt to determine the effect of molecular weight and solute concentration upon freezing point. The concentration of magnesium chloride used in the test was 15% by weight. The test results for simple carbohydrates and complex carbohydrates are tabulated below in Tables 5 and 6 respectively.

TABLE 5

SIMPLE CARBOHYDRATES

| Carbohydrate Type | Name | % Concentration of Carbohydrate | Freezing Point °F. | Freezing Point °C. |
|---|---|---|---|---|
| Control | MgCl$_2$ (15%) | Nil | −4.7 | −20.4 |
| Sugar | Fructose | 25.0 | −8.9 | −22.7 |
| Sugar | Fructose | 50.0 | −18.2 | −27.9 |
| Sugar | Fructose | 75.0 | −31.9 | −35.5 |
| Sugar | Glucose | 30.0 | −11.4 | −24.1 |
| Sugar | Glucose | 65.0 | −37.3 | −38.5 |
| Disaccharide | Maltose | 25.0 | −8.3 | −22.4 |
| Disaccharide | Lactose | 25.0 | −11.7 | −24.3 |

TABLE 6

COMPLEX CARBOHYDRATES

| Carbohydrate | % Concentration of Carbohydrate | Freezing Point °F. | Freezing Point °C. | Comments |
|---|---|---|---|---|
| Control MgCl$_2$ (15%) | Nil | −4.7 | −20.4 | |
| Corn syrup-high maltose | 30 | −5.6 | −20.9 | Contains glucose, maltose and maltotrisoe |
| Corn syrup-high maltose | 65 | −19.1 | −28.4 | |
| Corn syrup solids DE20 | 25.0 | −9.9 | −23.3 | Average Mol. Wt. 3746 |
| Corn syrup solids DE44 | 25.0 | −11.6 | −24.2 | Average Mol. Wt. 1120 |
| Corn syrup solids DE44 | 50.0 | −21.3 | −29.6 | |
| Corn syrup solids DE44 | 65.0 | −27.0 | −32.8 | |

It can be seen from the results above that glucose is better than fructose and of the two dissaccharides lactose is somewhat better than maltose. The corn syrup DE20 has about 47% of mono to hexasaccharides and the DE44 grade has about 69%, and the latter grade is slightly better in reducing freezing point. Also Table 6 shows that there is a relationship between carbohydrate concentration and freezing point thus allowing various formulations to be developed.

More complex carbohydrates were also evaluated such as dextrins and maltodextrins which are derived by hydrolysis (enzymatic or via dilute mineral acids) of corn starch. In addition a series of thickeners were evaluated. The control magnesium chloride solution was prepared from the hexahydrate in Table 7 below which shows the results obtained. Again all samples contained 15% by weight of magnesium chloride.

TABLE 7

| Compound | % Concentration | Freezing Point °F. | Freezing Point °C. | Comment |
|---|---|---|---|---|
| Control 15% MgCl$_2$ | Nil | +3.4 | −15.9 | |
| Dextrin | 5.0 | −4.7 | −20.4 | |
| Maltodextrin DE5 | 5.0 | −4.7 | −20.4 | |
| Maltodextrin DE15 | 9.1 | −17.1 | −27.3 | Lower Mol. Wt than DE 5 |
| Hydroxyethyl cellulose 250 HHR | 0.33 | +1.2 | −17.1 | Thickener |
| Carboxymethyl cellulose | 1.0 | +2.5 | −16.4 | Thickener |
| Gum arabic | 3.6 | −1.8 | −18.8 | Thickener |
| Gum tragacanth 470 | 0.2 | −3.3 | −19.6 | Thickener |

The Maltodextrin DE15 exhibits good results due to the lower molecular weight components present and the higher concentration. The higher the molecular weight, the less the influence upon freezing point. Some thickeners were unstable in the presence of magnesium chloride e.g. carboxy methyl cellulose, and so lose their efficacy as thickeners.

It is also important to define the chloride salt content for deicing/anti-icing liquids, the higher the chloride salt content, the lower the freezing point and the higher the ice melting characteristics. These characteristics are shown by the data in Table 8 below for Mg $Cl_2$ and Ca $Cl_2$ at varying salt and carbohydrate concentrations.

TABLE 8

| Chloride Salt | % salt by weight | % Carbohydrate by weight | Freezing Point ° F. | ° C. |
|---|---|---|---|---|
| $MgCl_2$ | 22.7 | 18.0 | Less than −47 | Less than −43.9 |
| $MgCl_2$ | 15.0 | 25.5 | −22 | −30 |
| $CaCl_2$ | 29.6 | 18.6 | Less than −47 | Less than −43.9 |
| $CaCl_2$ | 17.5 | 4.1 | −5.4 | −20.8 |
| $CaCl_2$ | 15.0 | 4.1 | −0.6 | −18.1 |

As the concentrations of salts and carbohydrates increase the freezing point of the mixtures decrease. In the case of calcium chloride at a fixed carbohydrate concentration of 4.1% an increase of 2.5% by weight of Ca $Cl_2$ decreased the freezing point by 4.8° F. (2.67° C.). Again formulations can be varied to suit local conditions. Care must be taken as salt concentrations approach the eutectic point on the freezing point—concentration curve where the freezing point can rise and the salt can crystallize out.

From the above discussion and laboratory evaluations the basic composition consists of at least the first two of the following components in aqueous solution depending upon ambient weather conditions, terrain, nature and amount of freezing/snow precipitation, environmental concerns, etc:

(1) An inorganic freezing point depressant in the form of inorganic electrolytes, mainly chlorides, but also others, such as sulfates and acetates, and could be used in concentrations of about 5 to 35 wt %. The main types employed are magnesium chloride, calcium chloride and sodium chloride.

(2) A carbohydrate, especially lower molecular weight carbohydrates in a range of about 180 to 1500. A preferred range is about 180 to 1,000. The carbohydrates can be obtained primarily from a wide range of agricultural based products such as those derived from corn, wheat, barley, oats, sugar cane, sugar beet, etc.

(3) Thickeners which are used in a concentration of about 0.15 to 10 wt % to increase the viscosity of the compositions so that the liquid remains in contact with the road surface or with the solid particles in piles of rock salt/sand, or rock salt/aggregates, or rock salt alone, or sand or aggregate. Thickeners are mainly cellulose derivatives such as methyl cellulose, hydroxy ethyl cellulose, hydroxy propyl methyl cellulose, hydroxy propyl cellulose, etc. or high molecular weight carbohydrates.

The corrosivity of deicing/anti-icing liquids is important due to the effect upon automobiles, other road transport vehicles, bridges, reinforcing rods (rebars) in concrete structures such as bridge decks, ramps and parking garage decks.

The testing of liquids for corrosivity can be quite complex and there are a number of tests developed by organizations such as ASTM and the National Association of Corrosion Engineers (NACE). The test conditions and metals must approximate those experienced in practice such as aerobic conditions and cold rolled steel specimens. Prior art tests using nails immersed in liquid contained in a screw top bottle are not meaningful mainly because of the anaerobic conditions and the variation in metal substrate composition, the degree of cold working and cleanliness.

Satisfactory test methods include SHRP H205.7 Test Method for Evaluation of Corrosive Effects of Deicing Chemicals or Metals (Handbook of Test Methods for Evaluating Chemical deicers SHRP-H332, Strategic Highway Research Program, National Research Council, Washington, D.C.) And the test described in the Deicer Specifications for the Pacific Northwest States of Idaho, Montana, Oregon, Washington. The latter is based upon the NACE Standard test Method for the Laboratory Corrosion Testing of Metals. TM0169-95.

Some corrosion rate results employing SHRP H205.7 showing corrosion inhibition due to carbohydrate presence are tabulated below in Table 9.

TABLE 9

| % Chloride Salt | % Carbohydrate | Corrosion Rate (mils per year) | | |
|---|---|---|---|---|
| | | One Week | Three weeks | Six weeks |
| 15% NaCl | Nil | 5.97 | 4.66 | 5.48 |
| 15% $MgCl_2$ | Nil | 2.58 | 1.93 | 1.73 |
| 15% $MgCl_2$ | 4.1 | 0.89 | 0.61 | 0.40 |

As can be seen from the data in Table 9, the carbohydrate magnesium chloride formulation reduces the corrosion rate of steel by 92.7% as compared to sodium chloride alone and 76.9% as compared to magnesium chloride alone. It is believed that the corrosion inhibiting effect is due to the presence of phytic acid and its salts which were present together with the carbohydrate. Formulations as shown in Examples III and IV (q.v.) were tested for corrosivity employing the Pacific Northwest States protocol and there was a reduction in the corrosion rate compared to sodium chloride solution of 57.2% for Example III and 40.4% for Example IV. This again shows corrosion inhibition properties.

The following examples are exemplary of various specific embodiments of the present invention which are useful as deicing agents:

EXAMPLE I

| Component | Part by Weight |
|---|---|
| Corn Syrup Solid DE 44 | 22.5 |
| Industrial grade magnesium chloride solution* | 50.0 |
| 2% Methocel Solution | 2.0 |
| Colorant (Caramel YT25) | 0.5 |
| Water | 25.0 |
| Freezing Point (ASTM-D 1177-94) | −12.5° F./−24.7° C. |
| Viscosity at 77°: | 20 centipoise |
| Appearance: | Gold color, clear solution |
| Odor: | Mild, pleasant |

*Note:
Industrial grade magnesium chloride solution is a commercially available magnesium chloride solution also containing calcium chloride, sodium chloride, potassium chloride.

EXAMPLE II

| Component | Parts by Weight |
|---|---|
| High maltose corn syrup | 31.5 |
| Industrial grade magnesium chloride solution | 50.0 |
| Colorant (Caramel YT25) | 0.5 |
| Water | 18.0 |

-continued

| Component | Parts by Weight |
|---|---|
| Freezing Point (ASTM-D 1177-94) | −22° F./−30° C. |
| Viscosity at 77° F. | 14.4 centipoises |
| Appearance | Gold color, clear solution |
| Odor | Mild, pleasant |

EXAMPLE III

| Components | Parts by Weight |
|---|---|
| High Maltose Corn Syrup | 22.2 |
| Industrial grade magnesium chloride solution | 70.0 |
| Water | 7.8 |
| Freezing point (ASTM-D 1177-94) | Less than −47° F./−43.9° C. |
| Appearance | Clear, light brown, mobile liquid |
| Odor | Mild, pleasant |
| Specific gravity | 1.27 |
| Viscosity at −94° F./−70° C. | Heavy syrup, flows |

EXAMPLE IV

| Component | Parts by Weight |
|---|---|
| High Maltose Corn Syrup | 20.5 |
| 43% CaCl$_2$ | 72.3 |
| Water | 7.2 |
| Freezing Point (ASTM- D 1177-94) | Less than −47° F./−43.9° C. |
| Appearance | Clear, colorless, mobile liquid |
| Odor | Mild, pleasant |
| Specific Gravity | 1.33 |
| Viscosity at −47° F./−43.9° C. | Very heavy syrup |

EXAMPLE V

| Component | Parts by Weight |
|---|---|
| High Fructose Corn Syrup | 19.55 |
| 43% Calcium Chloride Solution | 73.15 |
| Water | 7.30 |
| Freezing Point (ASTM- D 1177-94) | −31° F./−35° C. |
| Appearance | Clear, colorless, mobile liquid |
| Specific Gravity | 1.38 |
| Odor | Mild, pleasant |

EXAMPLE VI

| Component | Parts by Weight |
|---|---|
| Glucose | 32.5 |
| Industrial grade magnesium chloride solution | 50.0 |
| 2% Methoeel Solution | 2.0 |

-continued

| Component | Parts by Weight |
|---|---|
| Colorant (Caramel YT25) | 0.5 |
| Water | 15.0 |
| Freezing Point (ASTM- D 1177-94) | −38.2° F./−39.0° C. |
| Appearance | Gold color, clear solution |
| Odor | Mild, pleasant |

Colorants may also be used to enable applicators to see where the deicer has been deposited. Non-toxic colorants which may be used include caramel solutions and food grade dyes.

In a further embodiment of the present invention, it has been discovered that phytic acid can be used as a highly effective anti-corrosion agent in the de-icing anti-icing formulations of the present invention. The phytic acid may be added in the form of the acid itself or alternatively may be in the form of phytin or more correctly "phytates" which can be found in commonly occurring vegetation or in the form of organic waste materials residue formed from industrial processes.

Phytic acid is known chemically as Hexphosphorylated Myo-Inositol and its salts as Hexphosphorylates. Phytic acid is a six carbon ring compound with six phosphorus containing side groups attached to the ring.

Phytic acid is also known as:
Inositol Hexaphosphoric Acid
Hexakis (Dihydrogen Phosphate) Myo-Inositol
Myo-Inositol Hexakis (Dihydrogen Phosphate)
Myo-Inositol Hexakis Phosphate
Inositol Hexaphosphate
Myo-Inositol Hexaphosphate and in naturally occurring organophosphorus compound described in detail in "Phytic Acid: Chemistry and Applications", Edited by Ernst Graf, Pilatus Press, Minneapolis, Minn., 1986, ISBN 0-9614915-0-7. Also "Inositol Phosphates. Their Chemistry, Biochemistyr and Physiology", by D. J. Cosgrove, 1980, Elsevier Scientific Publishing, NY.

It is identied by CAS number 83-86-3 and EINECS/ELINCS number 201-506-5 [Note 'CAS' means Chemical Abstract Service used in the USA and EINECS means European Inventory of Existing Commerical Chemical Substances and ELINCS means European List of Notified Chemical Substances.]

Its formula is $C_6H_6[OPO(OH)_2]_6$ and the structural formula is shown below:

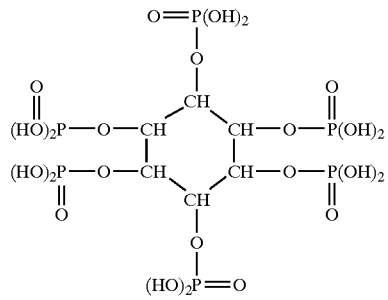

Phytic acid is a colorless to light yellow, viscous liquid with a density of 1.58 grams per ml and molecular weight of 660.

This reactive compound readily forms salts, also known as phytins, as well as chelate compounds. The phytate salt is formed from the acid by neutralization as illustrated below:

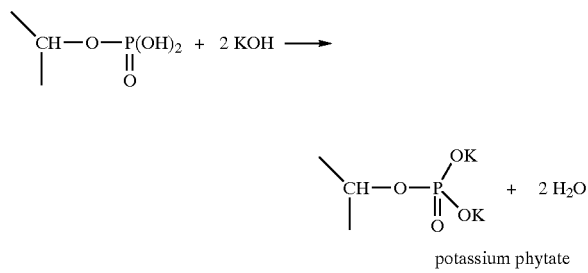

potassium phytate

From the structural formula it can be seen that there are twelve sites on the phosphoryl groups for monovalent atoms e.g. sodium, potassium etc, and six sites for divalent atoms e.g. magnesium, calcium etc. Mixed phytates can also be formed e.g. disodium, dipotassium monocalcium phytate. Naturally occurring phytins with high potassium to magnesium ratios are water soluble but low potassium to magnesium ratios are insoluble.

It has been found that phytic acid and its salts in concentrations of about 0.5 to 5.0% by weight of the formulation functions to provide a highly effective anti-corrosive agent. The biodegradation of phytins/phytates occurs by a hydrolysis reaction and catalyzed by phytases eventually yielding insoluble or poorly soluble phosphates such as $Mg_3(PO_4)_2$, $Ca_3(PO_4)_2$ or $Fe_3(PO_4)_2$. This essentially immobilizes the phosphates present.

While the present invention has been particularly shown and described herein with reference to various preferred modes it will be understood by one skilled in the art that various changes in detail may be effected therein without departing from the spirit and scope of the invention as defined by the claims.

We claim:

1. A method for reducing the buildup of snow and ice on an outdoor surface, comprising:
   applying to the outdoor surface a composition comprising:
   an aqueous solution which contains a low molecular weight carbohydrate, a chloride salt and phytic acid and its salts in which the constituents are present in the following concentration:

|  | Weight % |
|---|---|
| Carbohydrate | 3 to 60 |
| Chloride Salt | 5 to 35 |
| Phytic Acid and its salts | 0.5 to 5.0 |
| Water | Balance | and where said carbohydrate has a molecular weight in the range of about 180 to 1500, and is at least one selected from the group consisting of glucose, fructose and higher saccharides based on glucose and/or fructose and mixtures thereof.

2. The method of claim 1 in which the chloride salt is at least one selected from the group consisting of sodium chloride, magnesium chloride and calcium chloride.

3. A The method of claim 1 which further includes a colorant to provide visual aid in applying the composition to a surface.

4. A method for reducing the buildup of snow and ice on an outdoor surface, comprising:
   applying to the outdoor surface a composition comprising:
   an aqueous solution which contains a low molecular weight carbohydrate, a chloride salt, phytic acid and its salts, and a thickener in which the constituents are present in the following concentration:

|  | Weight % |
|---|---|
| Carbohydrate | 3 to 60 |
| Chloride Salt | 5 to 35 |
| Phytic Acid and its salts | 0.5 to 5.0 |
| Thickener | 0.15 to 10 |
| Water | Balance | and where the carbohydrate has a molecular weight of about 180 to 1500, and is at least one selected from the group consisting of glucose, fructose and higher saccharides based on glucose and/or fructose and mixtures thereof, and where the thickener is selected from the group consisting of high molecular weight cellulose derivatives and carbohydrates in the range of about 60,000 to 1,000,000 for cellulose derivatives and 10,000 to 50,000 for carbohydrates, with said composition having a viscosity in the range of about 0.1 to 3 poises at 25° C.

5. The method of claim 4 in which the chloride salt is at least one selected from the group consisting of sodium chloride, magnesium chloride and calcium chloride.

6. The method of claim 4 which further includes a colorant to provide visual aid in applying the composition to a surface.

7. A method for reducing the buildup of snow and ice on an outdoor surface, comprising:
   applying to the outdoor surface a composition comprising:
   an aqueous solution which contains a low molecular weight carbohydrate, a chloride salt and an anti-corrosion agent in which the constituents are present in the following concentration:

|  | Weight % |
|---|---|
| Carbohydrate | 3 to 60 |
| Chloride Salt | 5 to 35 |
| Anti-corrosion agent | 0.5 to 5.0 |
| Water | Balance | and where said carbohydrate has a molecular weight in the range of about 180 to 1500, and is at least one selected from the group consisting of glucose, fructose and higher saccharides based on glucose and/or fructose and mixtures thereof.

8. The method of claim 7 in which the anti-corrosion agent is at least one selected from the group consisting of phytic acid, phytin, phytates and mixtures thereof.

* * * * *